United States Patent [19]

Bains

[11] Patent Number: 5,701,438
[45] Date of Patent: Dec. 23, 1997

[54] LOGICAL RELOCATION OF MEMORY BASED ON MEMORY DEVICE TYPE

[75] Inventor: Kuljit S. Bains, Folsom, Calif.

[73] Assignee: Intel Corporation, Santa Clara, Calif.

[21] Appl. No.: 536,239

[22] Filed: Sep. 29, 1995

[51] Int. Cl.[6] .................................................. G06F 12/06
[52] U.S. Cl. ........................... 395/497.01; 395/405
[58] Field of Search ........................... 395/432, 497.01, 395/494, 674, 673, 405, 481

[56] References Cited

U.S. PATENT DOCUMENTS

| | | | |
|---|---|---|---|
| 4,899,272 | 2/1990 | Fung et al. | |
| 5,040,153 | 8/1991 | Fung et al. | |
| 5,307,320 | 4/1994 | Farrer et al. | |
| 5,333,311 | 7/1994 | Whipple, II | 395/621 |
| 5,418,924 | 5/1995 | Dresser | 395/494 |
| 5,509,138 | 4/1996 | Cash | 395/497.01 |
| 5,586,300 | 12/1996 | Wilcox | 395/477 |
| 5,592,652 | 1/1997 | Hongo | 395/497.01 |
| 5,596,747 | 1/1997 | Katabami | 395/612 |
| 5,598,540 | 1/1997 | Krueger | 395/284 |
| 5,603,911 | 2/1997 | Piazza | 395/497.01 |

*Primary Examiner*—Tod R. Swann
*Assistant Examiner*—Christopher S. Chow
*Attorney, Agent, or Firm*—Blakely, Sokoloff, Taylor & Zafman

[57] ABSTRACT

A memory addressing approach that logically relocates memory units based on their relative performance, independent of the physical location of the memory units in the computer system. The present invention operates in a computer system having a bus coupled to drive multiple memory units. The bus has memory address control signals addressing a predetermined address range. Memory type detection logic identifies at least the fastest of the memories. The mapping means of the invention then redirects the memory address control signals on the bus such that the fastest of the memory units is addressed by addresses at one end of the address range.

43 Claims, 6 Drawing Sheets

| PHYSICAL LOCATION 301 | MEMORY UNIT SIZE 303 | MEMORY UNIT START ADDRESS 305 | MEMORY UNIT END ADDRESS 307 | ... | HARDWIRED ROW 309 | LOGICAL ROW 311 |
|---|---|---|---|---|---|---|
| ROW 0 | 8 MEG | 4 MEG | 12 MEG | ... | 0 | 1 |
| ROW 1 | 8 MEG | 16 MEG | 24 MEG | ... | 1 | 3 |
| ROW 2 | 4 MEG | 0 | 4 MEG | ... | 2 | 0 |
| ROW 3 | 4 MEG | 12 MEG | 16 MEG | ... | 3 | 2 |

ORGANIZATION OF MEMORY UNIT BOUNDARY REGISTERS 205

FIGURE 3

LOGICAL RELOCATION OF MEMORY BASED ON MEMORY DEVICE TYPE

FIELD OF THE INVENTION

The invention relates to the field of computer systems. Specifically, the invention relates to improving memory subsystem performance in a computer system.

BACKGROUND OF THE INVENTION

Memory device speed has not increased as rapidly as microprocessor speed. Thus, memory subsystem performance is often the limiting factor in terms of overall computer system performance. For this reason, it is important to optimize memory subsystem performance in order to take advantage of the power and speed of the microprocessor.

A primary component of most computer system memory subsystems is the main memory. The main memory is most frequently formed of an array of dynamic random access memory (DRAM) devices defining a memory address range and operates to temporarily store applications programs and other software code for use by the computer system. The performance of a main memory array is measured in terms of its ability to respond quickly to repeated memory access requests from the processor.

The memory devices forming the main memory are usually arranged in rows with each row receiving particular address and control signals identifying the location of the row within the main memory address range. Although the memory devices forming a main memory array are most often arranged in rows, the term "memory unit" is used herein to refer to groups of memory devices, for example, a plurality of DRAMs on a daughter board, forming the main memory array in recognition of the fact that the memory devices may also be arranged in other configurations.

Many different types of DRAM devices are available ranging from high performance, more expensive DRAMS, such as synchronous DRAMs (SDRAMs) and extended data out (EDO) DRAMs, to lower performance, less costly DRAMs such as standard fast page mode (FP) DRAMs. DRAM types vary in performance based on their individual timing characteristics. EDO DRAMs are considered to be higher performance DRAMs than FP DRAMs, for example, and burst EDO (BEDO) DRAMs are higher performance than EDO DRAMs, because they are capable of supporting burst accesses while providing the other advantages of standard EDO DRAMs. SDRAMs are the highest performance DRAMs of the DRAM types named above based on their timing characteristics.

Further, devices having various access speeds are available within each different DRAM type. For example, an EDO DRAM having a 60 ns access time is faster than an EDO DRAM having a 70 ns access time. Although different access speeds are available, the relative performance of two memory devices is determined by memory device type first, and if the devices are the same type, then by the access speed. For example, EDO DRAMs of any access speed are considered to be higher performance than FP DRAMs of any access speed based on their access repetition rate capabilities.

The type and speed of the memory devices forming a memory array are factors in determining memory subsystem performance, however, when multiple types of memory devices are included in the same memory array, the impact of this factor can vary. In some computer systems, mixing higher performance memory with lower performance memory in a memory array provides little, if any, advantage as the lowest performance memory device type determines the timings for the entire memory subsystem. In other computer systems, however, it is possible to set the memory timings on a memory unit-by-memory unit, or row-by-row basis. In this case, it is still important to optimize the memory subsystem to take advantage of the higher performance, higher priced memory in a mixed memory array.

Some computer systems, such as those using the memory addressing system described in U.S. Pat. No. 4,899,272 to Fung et al., operate to compensate for memory boundary issues in a memory array including different sizes of memory devices. This and other similar approaches however, do not address the unique issues that arise in a memory array including multiple types of memory devices, where each different type of memory device has different timing requirements and varies in performance.

Allocation of main memory for software programs and other code is managed by the computer system operating system. When a memory allocation request is received by the operating system, it searches for free memory starting from one end of the main memory array address range or the other, depending on the particular operating system. Consequently, the most frequently accessed memory units in the main memory array, are those at the end of the address range that the operating system searches first when looking for available memory.

Thus, in a memory array including multiple types of memory devices, it is beneficial to locate the memory units including the highest performance memory devices at the most frequently accessed end of the address range to take full advantage of their capabilities. Further, because the operating system searches from one end of the memory array address range to the other, the remaining memory units should be arranged in descending order of memory unit device type performance level, from the most frequently accessed end of the address range to the least frequently accessed end of the address range. In this manner, the performance of the main memory array comes closest to the performance of a similar memory array that is populated entirely with devices of the highest performance memory type.

In prior art computer systems, there are issues with implementing this memory subsystem performance optimization, however. In many cases, computer systems are shipped with memory units or rows of memory soldered into the first few rows of the main memory array such that they cannot be removed without difficulty or risk of damaging components. Thus, when additional memory is added by a computer system user, it is not easy for the memory units to be physically rearranged to ensure that the highest performance memory units are at the most frequently accessed end of the main memory address range. Further, even when it is possible to physically relocate memory to take advantage of higher speed memory in a mixed memory subsystem, many computer system users are not knowledgeable in this area, and may be unaware of the performance trade-offs related to location of memory device types of varying performance levels in the memory array address range.

While this issue is described in the context of a main memory array including multiple types of DRAM devices, similar issues arise in other types of memory arrays including other types of devices. For example, the memory device types in a memory array to be optimized may also include video random access memory (VRAM), SGRAM, and RAMBUS DRAMs as well.

The present invention provides novel capabilities for optimizing memory subsystem performance where the memory subsystem includes multiple memory device types in a memory array.

SUMMARY OF THE INVENTION

The invention provides a method and apparatus for logically relocating memory units in a memory subsystem based on their performance. The present invention operates in a computer system having a bus coupled to drive multiple memory units. The bus has memory address control signals addressing a predetermined address range. The present invention includes logic means for determining at least the fastest of the memory units. The mapping means of the invention then redirects the memory address control signals on the bus such that the fastest of the memories is addressed by addresses at one end of the address range.

BRIEF DESCRIPTION OF THE DRAWINGS

FIG. 3 illustrates the memory unit boundary register organization of one embodiment of the invention.

DETAILED DESCRIPTION OF THE INVENTION

A method and apparatus for dynamically remapping memory device addresses based on the type of memory is disclosed. In the following description, numerous specific details are set forth, such as particular memory types, sizes and configurations, logic blocks, and signals in order to provide a thorough understanding of the present invention. However, it will be appreciated by one of ordinary skill in the art that the present invention may be practiced without these specific details. In other instances, well-known structures, circuit blocks, interfaces, and architectural functions have not been described in detail in order to avoid obscuring the present invention.

Overview of the Computer System of the Invention

Figure 1:
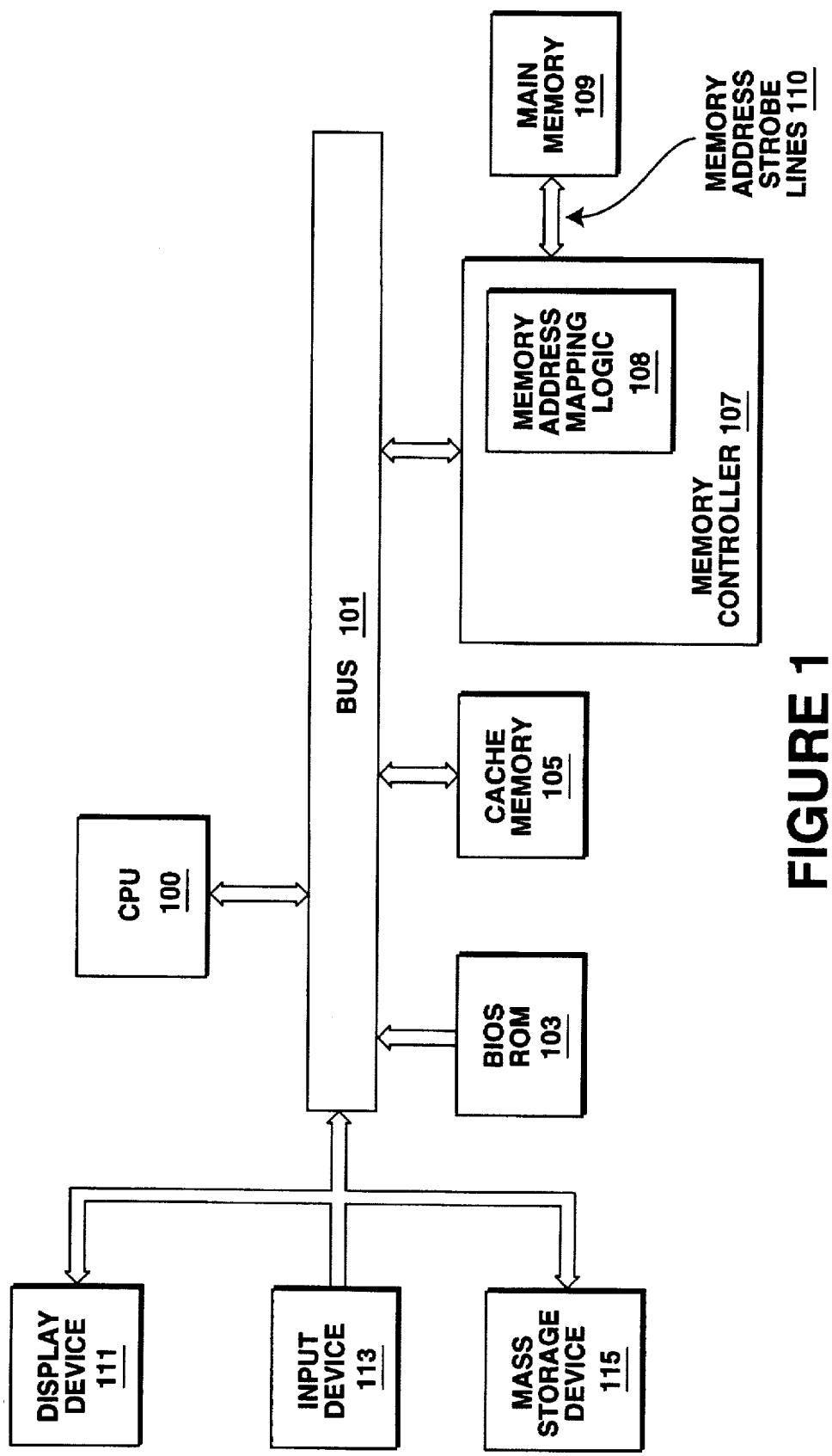
FIG. 1 illustrates a computer system in accordance with one embodiment of the invention.

FIG. 1 illustrates the computer system of one embodiment of the invention in block diagram form. The computer system includes a bus 101 for communicating information, a central processing unit (CPU) 100 coupled to the bus 101 for processing instructions, and a cache memory 105 coupled to the bus 101 for temporarily storing data and instructions for the CPU 100.

A read-only memory (ROM) 103 and a memory controller 107 are also coupled to bus 101. The ROM 103 stores the basic input/output system (BIOS) code as well as other code in some embodiments. The BIOS code is executed by the CPU 100 when it is powered up or restarted, and operates to initialize the computer system to a predetermined state. The memory controller 107 is coupled to the main memory 109 via memory address strobe lines 110 as well as other address and control signal lines (not shown). The memory controller 107 controls access to the main memory 109 and the cache memory 105. In one embodiment of the invention, the memory controller 107 includes memory address mapping logic 108. In alternate embodiments, memory address mapping logic 108 is integrated into another device within the computer system, or operates as a stand alone integrated circuit.

The computer system of the invention also includes a display device 111 coupled to the bus 101 for displaying information to the computer user, an input device 113 such as a keyboard and/or cursor control device coupled to bus 101 for communicating information and command selections to the CPU 100, and a mass storage device 115 also coupled the bus 101 for storing data for the computer system.

Main Memory and Memory Controller Arrangement of One Embodiment

Figure 2:
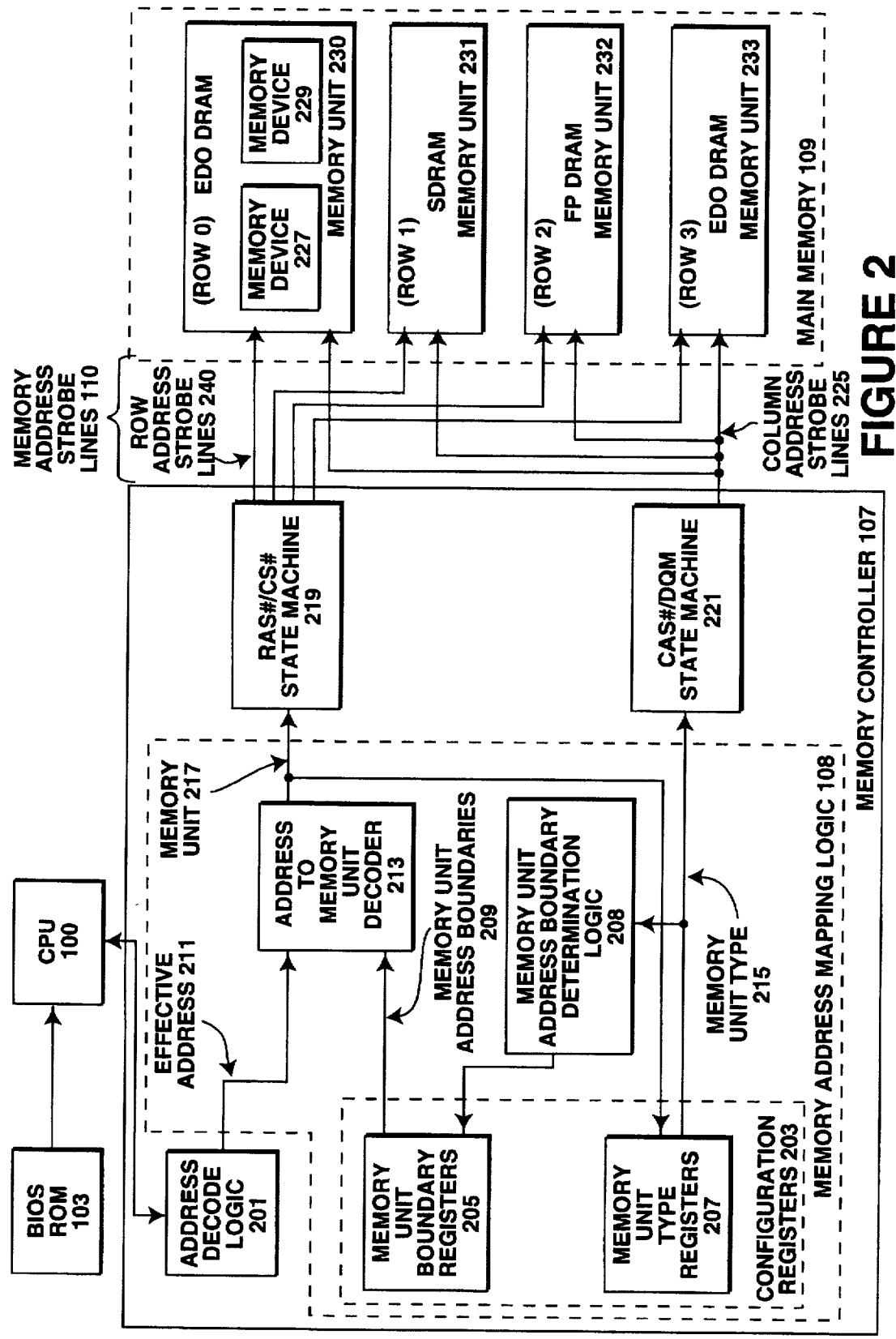
FIG. 2 illustrates the main memory and memory controller arrangement of one embodiment of the invention.

FIG. 2 illustrates the arrangement of the main memory 109 and the memory controller 107 of one embodiment of the invention. Although the invention is described in reference to a main memory array including particular types of memory devices, it will be appreciated by those of ordinary skill in the art that the invention may also be used in accordance with other types of memory arrays including different types of memory. Main memory 109 includes memory units 230–233. Memory units 230–233 include memory devices such as the memory devices 227 and 229 of memory unit 230. The memory devices, such as the memory devices 227 and 229, which make up a memory unit may be installed as individual devices or in the form of memory modules, such as single in-line memory modules (SIMMs) or dual in-line memory modules (DIMMs). Additionally, the memory units may include multiple memory banks. In the case in which two SIMMs are used in a row of memory, each SIMM is referred to as a memory bank. Each memory unit 230–233 in each memory unit location may include a different number of memory devices than those illustrated in FIG. 2. Further the main memory 109 may include unpopulated memory unit locations which do not contain memory devices.

Each of the populated memory unit locations containing memory units 230–233, includes one of a plurality of different types of memory devices. In the embodiment shown in FIG. 2, memory unit 230 is populated with extended data out (EDO) DRAM devices, memory unit 231 includes synchronous DRAM (SDRAM) devices, memory unit 232 includes fast page mode (FP) DRAM devices and memory unit 233 also includes EDO DRAM devices. Each type of DRAM device is characterized by different timing requirements to ensure reliable data accesses to the particular DRAM device. The individual timing requirements of each different type of DRAM device are well-known to those of ordinary skill in the art and are not discussed in detail herein. In alternate embodiments, the memory array of the invention may include other types of memory devices such as video random access memory (VRAM), SGRAM, or RAMBUS DRAMs.

In the embodiment illustrated in FIG. 2, memory units 230–233 are arranged in rows (row 0–row 3). Each memory unit 230–233 has a unique physical location in the main memory 109, defined, in this example, by the row in which the memory unit is located. The main memory 109 is coupled to the memory controller 107 by memory address strobe lines 110 which include row address strobe lines 240 and memory column address strobe lines 225. The signals on the row address strobe lines 240 include one row address strobe line for each physical row of main memory 109, including unpopulated memory unit locations (not shown). The row address strobe lines 240 operate, in part, to identify which of the memory units 230–233 is being addressed during a memory access. Although four rows of memory are illustrated in FIG. 2, main memory 109 may include a different number of memory units which may be arranged in a different configuration.

The memory controller circuit 107 includes configuration registers 203 and memory row mapping logic 108 in one embodiment. The memory controller 107 also includes circuitry (not shown in FIG. 2) for performing additional memory control functions, such as cache memory control, and in some embodiments, is integrated with bus bridge logic for communicating information between two buses in a computer system.

The configuration registers 203 include memory unit boundary registers 205 and memory unit type registers 207 in one embodiment of the invention. Additional configuration registers storing different types of information may also be included in the configuration registers 203. The memory unit type registers 207 and the memory unit boundary registers 205 each include one register for each memory unit 230–233 corresponding to the rows 0–3. In the embodiment illustrated in FIG. 2, information is stored in the memory unit type registers 207 and the memory unit boundary registers 205 in response to routines that are automatically executed by the CPU 100 upon power-up or restart. In alternate embodiments, information is stored in the memory unit type registers 207 and the memory unit boundary registers 205 based on input provided by the computer system user when configuring the computer system. User input may be entered via the input device 113 in response to prompts received on the display device 111 (FIG. 1), or the computer system may include hardware switches which are set to indicate the memory device type and storage capacity of each of the memory units 230–233.

In the case where information is stored in the configuration registers 203 automatically, the routines executed by the CPU 100 may be part of the initialization and set-up sequence stored in the BIOS ROM 103, and fetched when the computer system is turned on or restarted. One of the routines stored in the BIOS ROM 103 and executed by the CPU 100, is a routine to determine the type of memory devices in each of the memory units 230–233. Each of the memory units 230–233 may be populated with any one of several different types of available memory devices or it may be unpopulated. While each of the memory units 230–233 may include a different type of memory, it is assumed that all of the memory devices in a particular memory unit are the same memory device type.

The invention determines the type of memory devices in each of the memory units 230–233 based on the unique timing requirements of each different memory device type.

Once the memory device type for each individual memory unit 230–233 is determined, the information is stored in the memory unit type register 207 corresponding to that particular memory unit. The memory unit type information is stored in the memory unit type register 207 in the form of a two bit code in one embodiment. The two bit code indicates that the memory unit includes either FP DRAMs, EDO DRAMs, SDRAMs, or is an unpopulated memory unit. Alternate embodiments of the invention may include logic for distinguishing between other types of memory devices, and also may include a different number of bits for the memory unit device type code.

In some embodiments, it is also possible to determine the access speed of each of the memory units 230–233. The memory unit access speed of each of the memory units 230–233 can be determined during configuration or initialization, through a software detection routine, user input, or manipulation of hardware switches, and is also stored in the memory unit type registers 207 in one embodiment. In embodiments of the invention where the access speed of each memory unit 230–233 is identified, the relative performance of the memory units 230–233 in relation to each other is determined by the memory unit device type as well as the memory unit device access speed.

As part of the computer system initialization and set-up sequence, the BIOS stored in BIOS ROM 103 also executes a memory size determination routine which detects the size, or storage capacity, of each of the memory units 230–233. The results of the memory size determination routine for each of the memory units 230–233 are stored in the corresponding memory unit boundary registers 205. Details of the operation of BIOS memory sizing routines are well-known to those of ordinary skill in the art, and are not described in detail herein.

As discussed above, it is advantageous to arrange the memory units 230–233 from one end of the main memory 109 address range to the other in descending order of performance, with the memory unit including the fastest memory device type being located at the most frequently accessed end of the address range. The most frequently accessed end of the address range is determined by the characteristics of the computer system operating system software or other conditions affecting access frequency of particular memory locations.

Still referring to FIG. 2, the memory controller 107 also includes memory unit address boundary determination logic 208 in one embodiment. The memory unit address boundary determination logic 208, in cooperation with the configuration registers 203 of the invention operates to arrange memory units 230–233 in performance order, independent of the physical location of each of the memory units 230–233 in the main memory 109. The memory unit address boundary determination logic 208 of the invention is implemented in hardware with combinatorial and sequential logic in one embodiment. In alternate embodiments, the memory unit address boundary determination logic 208 is implemented in software. The software code of memory unit address boundary determination logic 208 may be part of the initialization sequence fetched from BIOS ROM 103 in one embodiment, or part of a separate software routine.

In one embodiment, once the type, size, and in some cases speed, of each of the memory units 230–233 is determined, the memory unit address boundary determination logic 208 of the invention determines memory address boundaries for each of the memory units 230–233. In other words, the memory address boundary determination logic 208 associates an address range with each of the memory units 230–233 to identify its logical location in the main memory 109 address range. The address range associated with each of the memory units 230–233 is based on the memory device type performance such that the memory units 230–233 are logically rearranged in performance order within the main memory 109 address range.

Memory unit address boundary determination logic 208 receives memory unit type information from the memory unit type registers 207. Memory unit address boundary determination logic 208 also receives information from the computer system during initialization, configuration, or loading of the operating system, indicating whether the highest performance memory units should be at the high end or low end of the main memory 109 address range. As discussed above, this preference is based on identifying the end of the main memory 109 address range which is likely to be accessed most frequently. Alternately, in some embodiments, the end of the address range at which it is preferable to locate the highest performance memory units is fixed, or is selectable according other means. For example, an original equipment manufacturer (OEM) or end-user may enter this information in cooperation with the BIOS during the computer set-up sequence or may set hardware switches to indicate the preferred end of the address range for locating the highest performance memory. This preference may also be programmed directly into a predetermined register location in the computer system in some embodiments.

In response to the memory unit type information from memory unit type registers 207 and the information regarding the preferred performance order, the memory unit boundary determination logic 208 logically reorders the memory units 230–233 in performance order by assigning starting, and in some embodiments, ending addresses for each of the memory units 230–233. The starting and ending addresses of each of the memory units 230–233 are within the address range of the main memory 109 and together make up the entire main memory 109 address range.

In the example illustrated in FIG. 2, the address range of the main memory 109 is equivalent to the combined storage capacity of the memory units 230–233 and the memory unit device types are as shown. Assuming, for purposes of illustration, that the upper end of the address range is identified as being accessed most frequently. In this case, the memory address mapping logic 108 of the invention will logically locate memory unit 231 including SDRAM at the upper end of the address range. Memory units 230 and 233 comprising EDO DRAM will follow in address order, and memory unit 232 comprising FP DRAM will be logically located at the bottom of the address range. In embodiments in which the access speed of each of the memory units is determined, the invention operates to arrange memory units in performance order from highest performance memory device type, highest access speed memory unit, to lowest performance, lowest access speed memory unit. In this case, the order of the memory units 230 and 233 in the address range is determined by their access speed if they are of the same memory type. If the access speed of the devices in both memory units 230 and 233 are the same, then either memory unit may follow memory unit 231 including SDRAM in the main memory 109 address range.

Referring now to FIG. 3, the organization of the memory unit boundary registers 205 of one embodiment of the invention is described in more detail to provide further clarity to the logical reordering operation of the invention. The memory unit boundary registers 205 store size and memory unit address boundary information for each of the memory units 230–233. Column 301, indicating the physical location of each of the memory units 230–233, is included in FIG. 3 for reference. Although the information in this field may be stored in memory unit boundary registers 205 in some embodiments, in other embodiments, the physical location of the memory unit is indicated by the particular register storing the size and memory unit boundary information.

Column 303 in FIG. 3 indicates the storage capacity of each of the memory units 230–233. Sample storage sizes are indicated in FIG. 3 to illustrate the type of information that is stored in this field. In practice, the storage capacity of a particular memory unit will be represented using a predetermined number of bits. The information in columns 305 and 307 indicates the starting and ending addresses of a particular memory unit within the address range of the main memory 109. The values illustrated in FIG. 3 are examples of the type of information that may be stored in fields 305 and 307. It will be appreciated by practitioners in the art that the numbers in FIG. 3 are rounded for purposes of illustration to indicate the memory range. In practice, the starting and ending addresses do not overlap. For example, if the memory in physical row 2 has a starting address of 0 and the starting address of the memory in physical row 0 is 4 MEG as illustrated, the ending address of the memory in physical row 0 is actually 4MEG-1.

Alternately, memory unit boundary registers 205 may only store the starting address of each memory unit. In this case, the ending address of each of the memory units 230–233 is determined by looking at the starting address of the logically adjacent, subsequent memory unit. Starting and ending addresses in columns 305 and 307 of memory unit boundary registers 305 are also stored in the form of a predetermined number of bits.

As illustrated, the logical order of the memory units 230–233 in the main memory 109 address range is indicated by the memory address boundaries of each of the memory units 230–233. Thus, although the physical or hardwired location of each of the memory units 230–233 is not altered as indicated in column 309 of FIG. 3, the logical order in which the memory units 230–233 are addressed within the main memory 109 address range is altered by assigning address boundaries based on the memory unit device type and its relative performance level as illustrated in column 311 of FIG. 3.

Referring back to FIG. 2, the operation of the memory controller 107 and the main memory 109 is described in more detail. Address decode logic 201 of the memory controller 107 receives a memory address from the CPU 100 indicating a location in the main memory 109 that is to be accessed. The address decode logic 201 decodes the address received from the CPU 100 into an effective address which is transmitted over conductive path 211 to an address-to-memory unit decoder 213.

The address-to-memory unit decoder 213 also receives memory unit address boundary information from the memory unit boundary registers 205 over conductive path 209. The address-to-memory unit decoder 213 compares the effective address received on the conductive path 211 to the memory unit address boundary information transmitted on the conductive path 209. Based on this comparison, the address-to-memory unit decoder 213 determines which of the memory units 230–233 contains the logical address indicated by the effective address received on the conductive path 211. Once the particular memory unit is identified by the address-to-memory unit decoder 213, the memory unit information, the physical row number in this example, is transmitted to a state machine such as RAS#/CS# state machine 219 to generate a memory unit or row address strobe signal, or if the identified memory unit includes SDRAMs, a chip select (CS#) signal.

It should be noted that the signals for accessing SDRAMs are different than the signals for accessing other types of DRAM devices. Thus, in one embodiment, the pins (not shown) of the memory controller 107 are multiplexed to provide SDRAM signals as well as the traditional DRAM signals using the same pins. In this case, the type of signal transmitted is selected according to the type of memory devices populating the selected memory unit of memory units 230–233. The details of the SDRAM signals are not described herein as they are well-known to those of ordinary skill in the art.

The RAS#/CS# state machine 219 generates row address strobe (RAS#) or chip select (CS#) signals, which are transmitted over the row address strobe lines 240. The RAS# signal indicates that the address on the address lines (not shown) is a valid memory unit address. The '#' is used to indicate that the RAS# and CS# signals are active low, as is the custom for these signals. Row address strobe lines 240 include one strobe line for each of the memory units 230–233 and are often referred to as RAS# lines 0–3 or CS# lines 0–3 in embodiments including four memory units. Once the memory unit 230, 231, 232 or 233 containing the effective address is identified, the RAS#/CS# state machine 219 transmits a RAS# or CS# signal, depending on the memory unit device type, over the particular row address strobe line 240 corresponding to the identified memory unit. In this manner, the invention operates to logically reorder memory units 230–233 based on memory unit device type.

The memory controller 107 also includes a state machine such as CAS#/DQM state machine 221. In the case of a non-SDRAM memory unit device type, CAS#/DQM state machine 221 generates column address signals to indicate that the address on the address lines (not shown) is a valid column address. If the memory unit device type is SDRAM, the CAS#/DQM state machine generates a data masking (DQM) signal to control data accesses to the memory unit. The CAS# and DQM signals are transmitted to the memory units 230–233 over column address strobe lines 225, also referred to as CAS#/DQM signal lines. Column address strobe lines 225 are coupled to all of the memory units 230–233.

In one embodiment, the CAS# and DQM signals are multiplexed as described above with reference to the RAS# and CS# signals, and the signal that is transmitted is selected based on the memory device type in the particular memory unit. The CAS#/DQM state machine 221 receives the memory unit type information for the selected memory unit from the memory unit type registers 207 over conductive path 215. Based on the memory unit device type, the CAS#/DQM state machine 221 controls the timing of the CAS# or DQM signals to meet the unique timing requirements of each different type of memory device. The operation of the CAS# state machine 221 for different types of memory devices is described in more detail in the copending U.S. patent application entitled "A Method and Apparatus for Integrating and Determining Whether a Memory Subsystem is Installed with Standard Page Mode Memory or an Extended Data Out Memory", Ser. No. 08/348,365, filed Nov. 30, 1994, and assigned to the assignee of the present invention.

Figure 4:
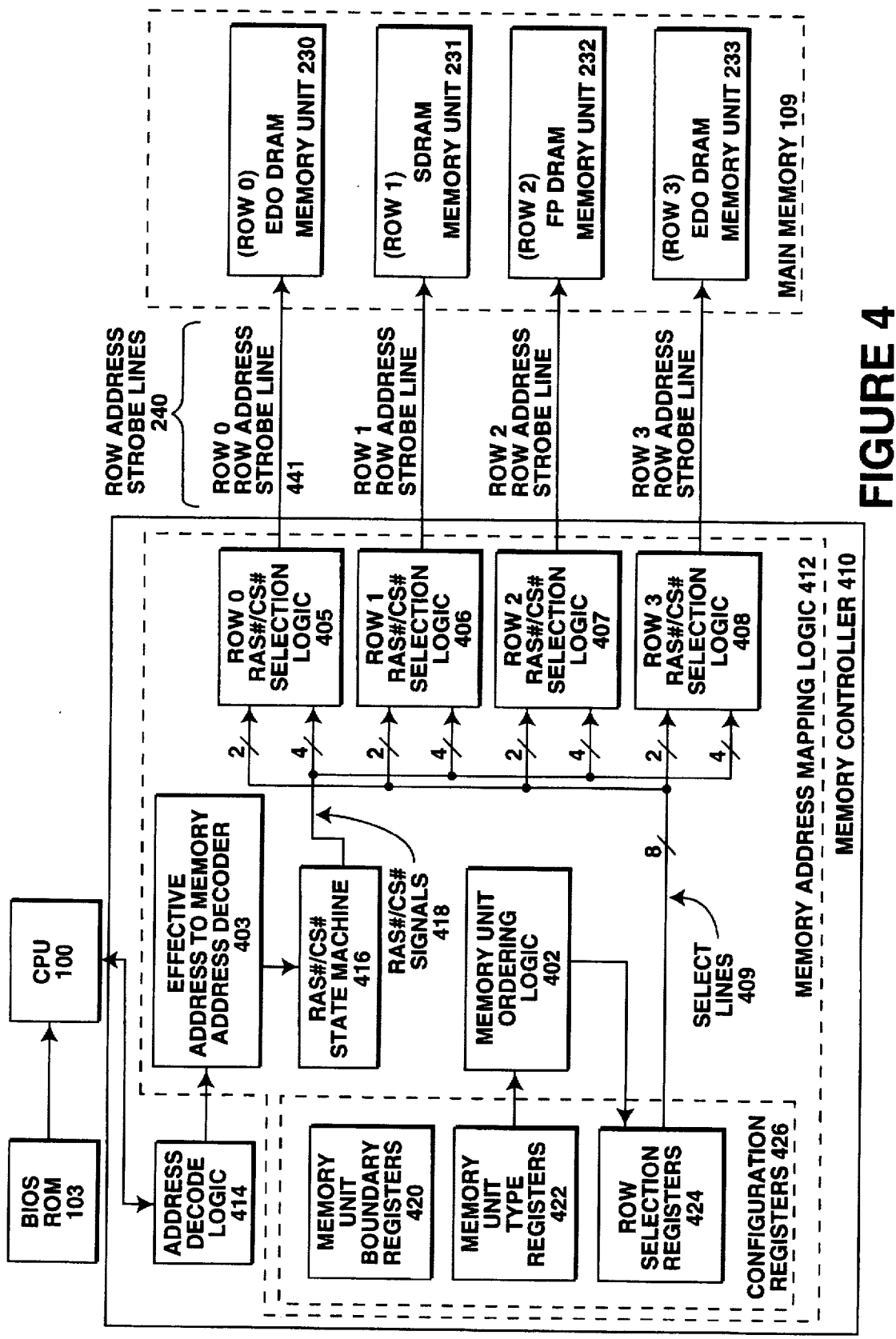
FIG. 4 illustrates the main memory and memory controller arrangement of an alternate embodiment of the invention.

Main Memory and Memory Controller Arrangement of an Alternate Embodiment of the Invention FIG. 4 illustrates an alternate embodiment of the arrangement of the memory controller 410, which performs the same general function as the memory controller 107 except as noted below, and the main memory 109 of the invention. Reference numbers in FIG. 4 identical to those in FIG. 2 indicate similar elements. The embodiment illustrated in FIG. 4 also operates to logically reorder memory units 230–233 based on the relative performance of each memory unit device type.

In the embodiment illustrated in FIG. 4, the memory controller includes memory address mapping logic 412 which performs the same function as memory address mapping logic 108, except as noted below. The memory address mapping logic includes configuration registers 426 including row selection registers 424, memory unit type registers 422 and memory unit boundary registers 420. Units with identical names to units in FIG. 2 perform similar functions. The memory address mapping logic 412 further includes memory unit ordering logic 402. The row selection registers 424 include a register for each of the memory units 230–233 in the main memory 109, and assist with the logical reordering function of the invention. The size and type of each of the memory units 230–233 are determined and stored in memory unit boundary registers 420, and memory unit type registers 422 respectively, as discussed above with reference to similar units in FIG. 2. Once the memory unit type has been determined, this information is processed by the memory unit ordering logic 402 to arrange the memory units 230–233 in performance order across the address range of the main memory 109. The memory unit order is then stored in the row selection registers 424. The memory unit ordering logic 402 is implemented in hardware in one embodiment. In alternate embodiments, memory unit ordering logic 402 is implemented in software and may be part of the BIOS code stored in the BIOS ROM 103.

In the example illustrated in FIG. 4, memory units 230 and 233 are populated with EDO DRAM, memory unit 231 with SDRAM, and memory unit 232 with FP DRAM. The memory unit ordering logic 402 receives this information from the memory unit type registers 422 and determines that the memory unit 231 populated with SDRAM should be logically located at the most frequently accessed end of the memory address range, followed by the memory units 230 and 233 populated with EDO DRAM, and the memory unit 232 populated with FP DRAM is at the least frequently accessed end of the address range.

The memory unit ordering logic 402 determines the performance order for memory units 230–233 and stores the order information in the row selection registers 424. The order information is stored in the form of a two bit code for each row of memory in this example to indicate a logical row for each of the physical memory units 230–233 in the main memory 109. For example, in the embodiment illustrated in FIG. 4, the memory unit ordering logic 402 stores a "11" in the row selection register corresponding to the memory unit 231 containing SDRAMs to indicate that the memory unit 231 should be located in the last logical row of memory, or the top of the address range, and a "00" in the row selection register corresponding to the memory unit 232 containing FP DRAMs to indicate that the memory unit 232 should be located in the first logical row of memory. The two bit code stored in row selection registers 424 is used as the selection control transmitted on select lines 409 to RAS#/CS# selection logic 405–408 on memory controller 410. The RAS#/CS# selection logic 405–408 of the invention selects one of the four RAS# or CS# signals for each of the row address strobe lines 240 such that the memory units 230–233 are arranged in the desired address order.

Figure 5:
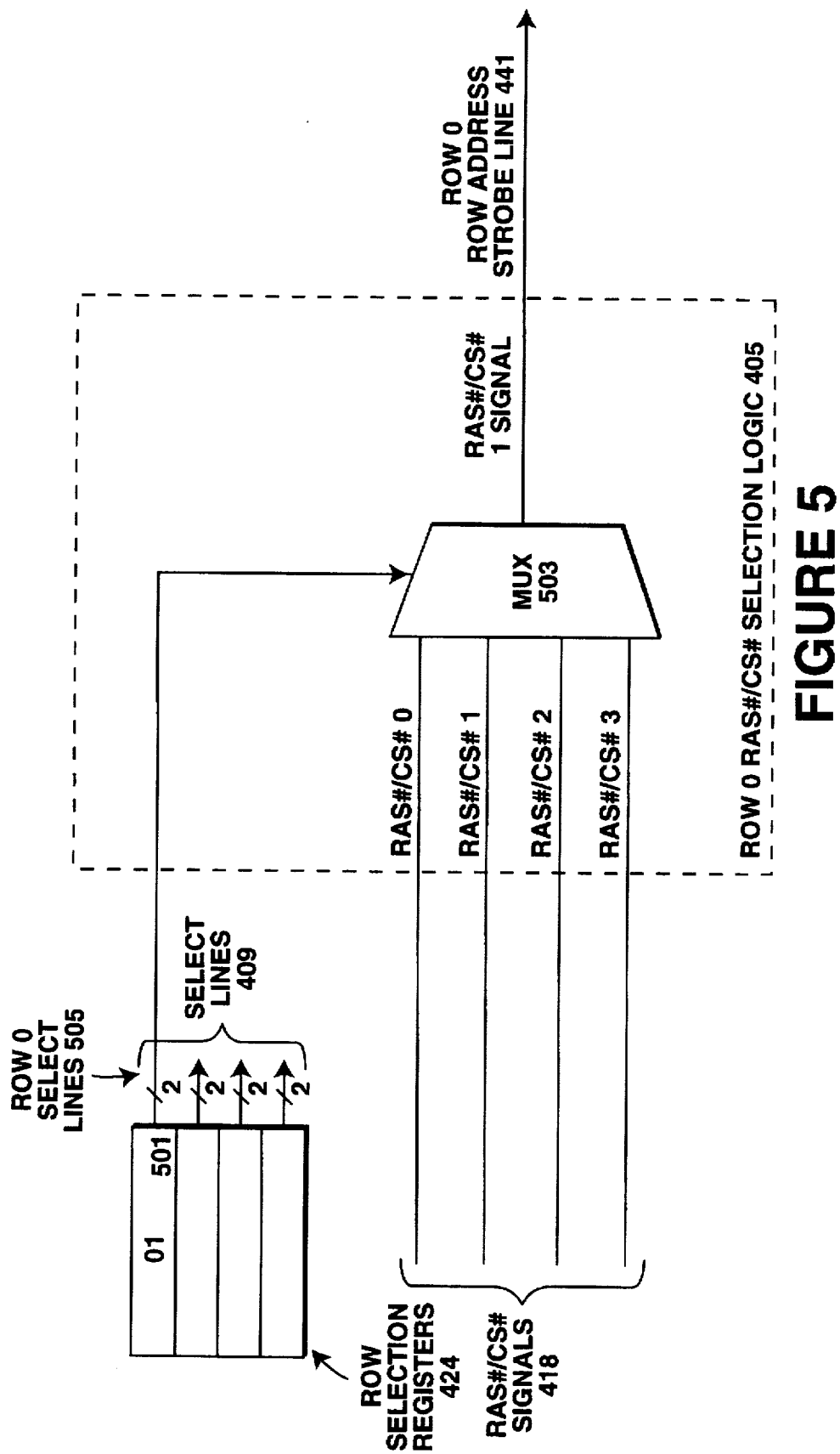
FIG. 5 illustrates the address control signal line selection logic of one embodiment of the invention.

The operation of row 0 RAS#/CS# selection logic 405 is described in more detail in reference to FIG. 5. Row 0 RAS#/CS# selection logic 405 receives all four RAS#/CS# signals 418 as well as row selection information from the row selection registers 424 over select lines 409 at multiplexer (mux) 503. Register 501 in FIG. 5 is the row selection register 424 for physical row 0 containing memory unit 230, in this example. The "01" stored in the register 501 indicates that the memory unit 230 should receive RAS#/CS# line 1 such that it is logically located in the second row of memory in the main memory 109 address range. The code stored in register 501 operates as the control or selection criteria to select a particular RAS# or CS# signal, RAS#/CS# 1 in this example, to logically order a particular memory unit within the memory address range. The selected signal is transmitted over the row 0 row address strobe line 441.

The physical connection between each of the memory units 230–233 and its respective row address strobe line of row address strobe lines 240 (FIG. 4) is fixed. In the embodiment illustrated in FIG. 4, the logical reordering of memory units 230–233 is accomplished by directing RAS#/CS# signals to the memory units 230–233 such that they are arranged in performance order. The remaining RAS#/CS# selection logic units 406–408 operate in a similar manner to row 0 RAS#/CS# selection logic 405.

Although the RAS#/CS# selection logic 405–408 of the invention receives four RAS#/CS# signals 418 and two select signals on select lines 409, other embodiments may include a different number of memory units requiring a different number of RAS#/CS# and select signals. Further, although particular embodiments of the memory address mapping logic have been described herein, alternate embodiments include logic which performs the same function, but in a different manner.

The Method of One Embodiment of the Invention

Figure 6:
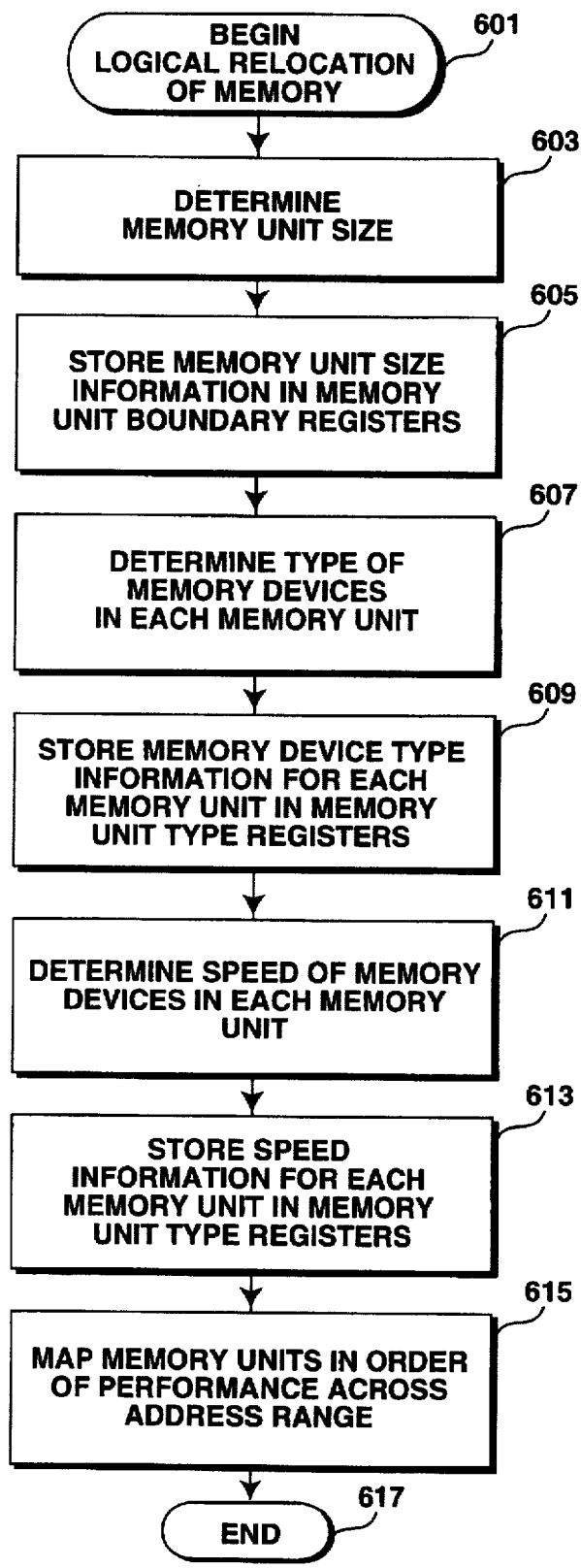
FIG. 6 illustrates the logical memory relocation method of one embodiment of the invention.

FIG. 6 is a flow chart illustrating the logical memory relocation method of one embodiment of the invention which begins at box 601. As illustrated at box 603, the BIOS software determines the size, or storage capacity, of each of the memory units in the main memory, and stores the memory unit size information in the respective memory unit boundary register at step 605. At box 607, the BIOS along with memory unit type detection logic of the memory controller or other computer system component, determines the type of memory devices in each of the memory units or memory rows in the main memory. The memory unit device type information is stored in the memory unit type register corresponding to each memory unit at step 609.

At box 611, the speed of each of the memory units is determined in some embodiments, and stored in the memory unit type registers at step 613. In step 615, the memory units are logically mapped in order of performance across the address range of the main memory such that the memory unit with the highest performance memory unit device type is logically located at the end of the address range that is most frequently accessed. The method of the invention ends at step 617.

Thus, the present invention provides a method and apparatus for logically remapping memory based on memory device type to optimize memory subsystem performance. Whereas many alterations and modifications of the present invention may occur to one of ordinary skill in the art after having read the foregoing description, it is to be understood that the particular embodiments shown and described by way of illustration are in no way intended to be considered limiting. Therefore, references to details of various embodiments are not intended to limit the scope of the claims which in themselves recite only those features regarded as essential to the invention.

I claim:

1. In a computer system having a bus coupled to address a plurality of memory units, the bus communicating memory address control signals addressing a predetermined address range, an improvement comprising:
   logic means for determining at least the fastest of the memory units; and
   mapping means responsive to the logic means for redirecting the memory address control signals on the bus such that the fastest of the memory units is addressed by addresses at one end of the address range.

2. The improvement as set forth in claim 1 wherein each of the plurality of memory units comprises one or more memory devices of one of a plurality of memory device types, the memory device types ranging in speed from a fastest memory device type to a slowest memory device type.

3. The improvement as set forth in claim 2 further including detecting means coupled to the logic means for detecting the memory device type of the memory devices in each of the memory units, the logic means being responsive to the detecting means to determine the fastest of the memory units.

4. The improvement as set forth in claim 2 wherein the detecting means further determines an access speed of each of the memory units and the logic means determines the fastest of the memory units in response to detecting the memory device type and an access speed of the memory devices in each of the memory units.

5. The improvement as set forth in claim 2 wherein the memory devices are dynamic random access memories (DRAMs), and wherein the plurality of memory device types includes fast page mode (FP) DRAMs, extended data out (EDO) DRAMs, burst extended data out (BEDO) DRAMs and synchronous DRAMs (SDRAMs).

6. The improvement as set forth in claim 3 wherein the memory address control signals include a memory unit address control signal for each of the memory units, and wherein the particular memory unit address control signal communicated to each particular memory unit determines an address order of the memory unit with respect to the other memory units in the address range.

7. The improvement as set forth in claim 6 wherein the mapping means selects the particular memory unit address control signal to direct to a particular memory unit in response to determining the memory device type of each of the memory units, such that the memory units are addressed in order from the fastest of the memory units at one end of the address range to the slowest of the memory units at the opposite end of the address range.

8. The improvement as set forth in claim 3 further including a set of registers coupled to the mapping means, the set of registers including one register for each of the memory units, each register storing a starting address of a corresponding memory unit, the starting address stored in the register determining an order of the memory unit with respect to the other memory units in the address range.

9. The improvement as set forth in claim 8 further including logic means for determining a storage capacity of each of the memory units, wherein the starting address stored in each register for each of the memory units is determined in response to the memory unit device type and storage capacity of each memory unit, such that the memory units are addressed in order from the fastest of the memory units at one end of the address range to the slowest of the memory units at the opposite end of the address range.

10. The improvement as set forth in claim 9 wherein the memory address control signals control addressing of the memory in response to the starting address stored in the registers.

11. The improvement as set forth in claim 6 wherein each of the memory units is addressed as a memory row and the memory unit address control signals are memory row address control signals.

12. A circuit for optimizing memory subsystem performance in a computer system, the memory subsystem including a bus communicating memory address control signals to a plurality of memory units in a predetermined address range, the memory units ranging in performance from a highest performance memory unit to a lowest performance memory unit, the circuit comprising:

memory type detection logic for identifying at least the highest performance memory unit; and signal mapping logic responsive to the memory type detection logic for controlling the memory address control signals to logically relocate the highest performance memory unit to one end of the address range, independent of a physical location of the memory unit in the memory subsystem.

13. The circuit as set forth in claim 12 wherein each of the plurality of memory units comprises one or more memory devices of one of a plurality of memory device types, the memory device types ranging from a highest performance memory device type to a lowest performance memory device type.

14. The circuit as set forth in claim 13 wherein the memory type detection logic identifies the highest performance memory unit in response to detecting the memory device type of the memory devices in each of the memory units.

15. The circuit as set forth in claim 13 wherein the memory type detection logic identifies the highest performance memory unit in response to detecting the memory device type and an access speed of the memory devices in each of the memory units.

16. The circuit as set forth in claim 15 wherein the memory devices are dynamic random access memories (DRAMs) and wherein the plurality of memory device types includes fast page mode (FP) DRAMs, extended data out (EDO) DRAMs, burst extended data out (BEDO) DRAMs and synchronous DRAMs (SDRAMs).

17. The circuit as set forth in claim 14 wherein the memory address control signals include a memory unit address control signal for each of the memory units, and wherein the particular memory unit address control signal communicated to each particular memory unit determines a logical location of the memory unit with respect to the other memory units in the address range.

18. The circuit as set forth in claim 17 wherein the signal mapping logic selects a particular memory unit address control signal to direct to a particular memory unit in response to determining the memory device type of each of the memory units, such that the memory units are logically ordered from the highest performance memory unit at one end of the address range to the lowest performance memory unit at the opposite end of the address range.

19. The circuit as set forth in claim 15 further including a set of registers coupled to the signal mapping logic, the set of registers including a register for each of the memory units, each register storing a starting address of a corresponding memory unit, the starting address stored in the register determining a logical order of the memory unit with respect to the other memory units in the address range.

20. The circuit as set forth in claim 19 further including memory size detection logic for determining a storage capacity of each of the memory units and wherein the starting address stored in each register for each of the memory units is determined in response to the memory unit device type and storage capacity of each memory unit, such that the memory units are addressed in order from the fastest of the memory units at one end of the address range to the slowest of the memory units at the opposite end of the address range.

21. The circuit as set forth in claim 20 wherein the memory address control signals control addressing of the memory response to the starting address stored in the registers.

22. The circuit as set forth in claim 17 wherein each of the memory units is addressed as a memory row and the memory unit address control signals are memory row address control signals.

23. A computer system comprising:

a processor;

a bus coupled to the processor for communicating information;

a main memory coupled to the bus, the main memory having a predetermined address range, the main memory including a plurality of memory units ranging in performance from a highest performance memory unit to a lowest performance memory unit; and a memory controller for controlling accesses to the main memory, the memory controller including:

a plurality of signal lines for communicating memory address control signals, memory type detection logic for identifying at least the highest performance memory unit, and memory unit mapping logic responsive to the memory type detection logic for controlling the memory address control signals to logically relocate the highest performance memory unit to one end of the address range, independent of a physical location of the memory unit in the memory subsystem.

24. The computer system as set forth in claim 23 wherein each of the plurality of memory units comprises one or more memory devices of one of a plurality of memory device types, the memory device types ranging from a highest performance memory device type to a lowest performance memory device type.

25. The computer system as set forth in claim 24 wherein the memory type detection logic identifies the highest performance memory unit in response to detecting the memory device type of the memory devices in each of the memory units.

26. The computer system as set forth in claim 25 further including a basic input output system (BIOS) having memory type detection code and wherein the memory type detection logic is responsive to the BIOS to detect the memory device type of the memory devices in each of the memory units.

27. The computer system as set forth in claim 24 wherein the memory type detection logic identifies the highest performance memory unit in response to detecting the memory device type and an access speed of the memory devices in each of the memory units.

28. The computer system as set forth in claim 24 wherein the memory devices are dynamic random access memories (DRAMs) and wherein the plurality of memory device types includes fast page mode (FP) DRAMs, extended data out (EDO) DRAMs, burst extended data out (BEDO) DRAMs and synchronous DRAMs (SDRAMs).

29. The computer system as set forth in claim 25 wherein the memory address control signals include a memory unit address control signal for each of the memory units, and wherein the particular memory unit address control signal communicated to each particular memory unit determines a logical location of the memory unit with respect to the other memory units in the address range.

30. The computer system as set forth in claim 29 wherein the memory unit mapping logic selects a particular memory unit address control signal to direct to a particular memory unit in response to determining the memory device type of each of the memory units, such that the memory units are logically ordered from the highest performance memory unit at one end of the address range to the lowest performance memory unit at the opposite end of the address range.

31. The computer system as set forth in claim 25 further including a set of registers coupled to the memory unit mapping logic, the set of registers including a register for each of the memory units, each register storing a starting address of a corresponding memory unit, the starting address stored in the register determining a logical order of the memory unit with respect to the other memory units in the address range.

32. The computer system as set forth in claim 31 further including memory size detection logic for determining a storage capacity of each of the memory units and wherein the starting address stored in each register for each of the memory units is determined in response to the memory unit device type and storage capacity of each memory unit, such that the memory units are addressed in order from the fastest of the memory units at one end of the address range to the slowest of the memory units at the opposite end of the address range.

33. The computer system as set forth in claim 32 wherein the memory address control signals control addressing of the memory in response to the starting address stored in the registers.

34. The computer system as set forth in claim 29 wherein each of the memory units is addressed as a memory row and the memory unit address control signals are memory row address control signals.

35. In a computer system, a method for optimizing memory subsystem performance, the memory subsystem including a plurality of memory units in a predetermined address range, the memory units ranging in performance from a highest performance memory unit to a lowest performance memory unit, the method comprising the steps of:

identifying at least the highest performance unit; and logically relocating the highest performance memory unit to one end of the address range, independent of a physical location of the memory unit in the memory subsystem.

36. The method as set forth in claim 35 wherein each of the plurality of memory units comprises one or more memory devices of one of a plurality of memory device types, the memory device types ranging from a highest performance memory device type to a lowest performance memory device type.

37. The method as set forth in claim 36 further including a step of detecting the memory device type of the memory devices in each of the memory units.

38. The method as set forth in claim 37 wherein the step of identifying is performed in response to detecting the memory device type.

39. The method as set forth in claim 38 further including a step of logically relocating the remaining memory units in performance order such that the lowest performance memory unit is logically located at an end of the address range opposite the highest performance memory unit.

40. The method as set forth in claim 38 further including a step of determining the access speed of the memory devices in each of the memory units, and wherein the step of identifying is performed in response to detecting the device type and determining the access speed.

41. The method as set forth in claim 39 wherein the plurality of memory device types includes fast page mode (FP) DRAMs, extended data out (EDO) DRAMs, burst extended data out (BEDO) DRAMs and synchronous DRAMs (SDRAMs).

42. The method as set forth in claim 39 wherein the computer system includes a memory bus communicating memory address control signals to the memory units, the memory address control signals identifying a particular memory addressing order, and wherein the step of logically relocating is performed by remapping the memory address control signals on the memory bus.

43. The method as set forth in claim 39 wherein the computer system includes a set of registers, the set of registers including one register for each of the memory units, each register storing a starting address of the corresponding memory unit, and wherein the steps of logically relocating are performed by changing the starting addresses of the memory units in the registers.

* * * * *